United States Patent [19]
Vaucher

[11] 3,919,782
[45] Nov. 18, 1975

[54] MAGNETIC COMPASS ASSEMBLY
[75] Inventor: Denis Maurice Vaucher, La Neuveville, Switzerland
[73] Assignee: Recta Manufacture d'Horlogerie S.A., Beinne, Switzerland
[22] Filed: Apr. 3, 1974
[21] Appl. No.: 457,557

[30] Foreign Application Priority Data
Apr. 6, 1973 Switzerland.......................... 4973/73

[52] U.S. Cl..................................... 33/349; 33/356
[51] Int. Cl.²........................................ G01C 17/10
[58] Field of Search ............ 33/272, 333, 352, 355, 33/349, 356

[56] References Cited
UNITED STATES PATENTS
2,487,044  11/1949  Cude................................ 33/349 X
2,680,297  6/1954  Vaucher ............................... 33/272
3,041,917  7/1962  Glatt................................. 33/355 X FOREIGN PATENTS OR APPLICATIONS
259,122  10/1926  United Kingdom................... 33/349

Primary Examiner—Richard E. Aegerter
Assistant Examiner—Charles E. Phillips

[57] ABSTRACT

A compass assembly having an adjustable sighting element whereby the line of sight may be set to meet individual requirements. The assembly is constituted by a transparent compass capsule having a magnetic needle therein which is movable relative to a compass scale. The capsule is detachably received in a casing having a depression formed in the bottom thereof to accommodate a sighting element which is adjustable to assume a selected angular position, the line of sight and its orientation relative to said compass scale being viewable through said capsule.

11 Claims, 3 Drawing Figures

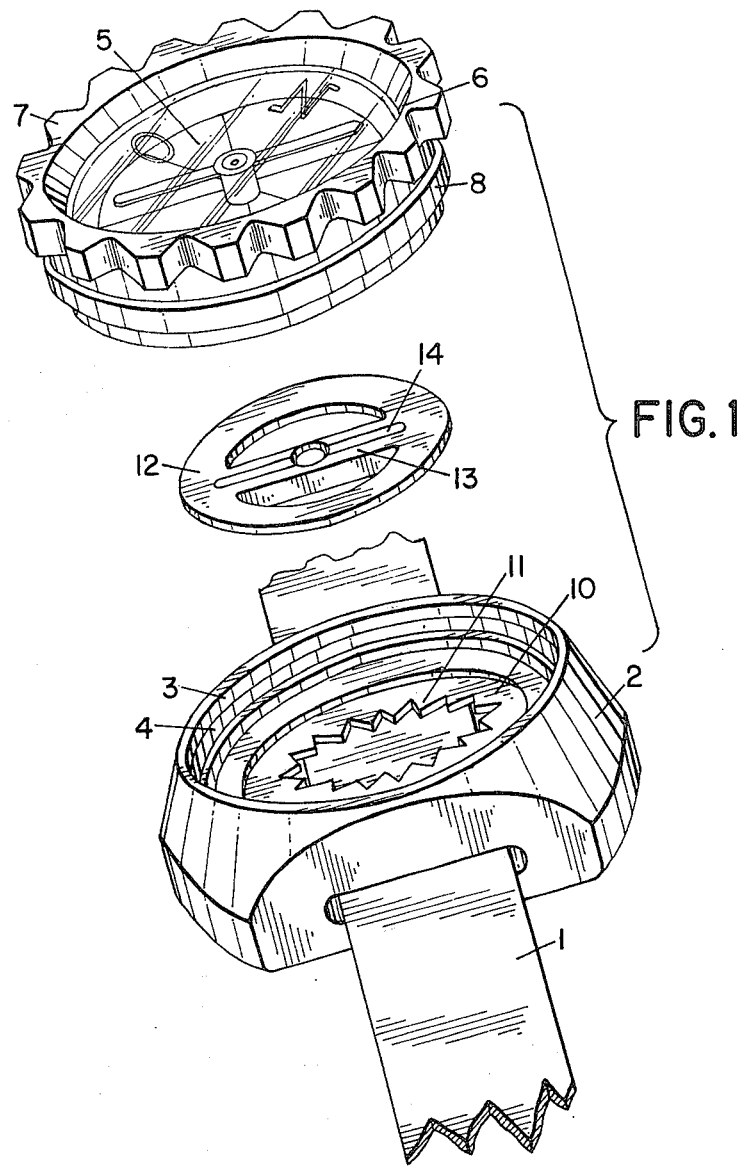
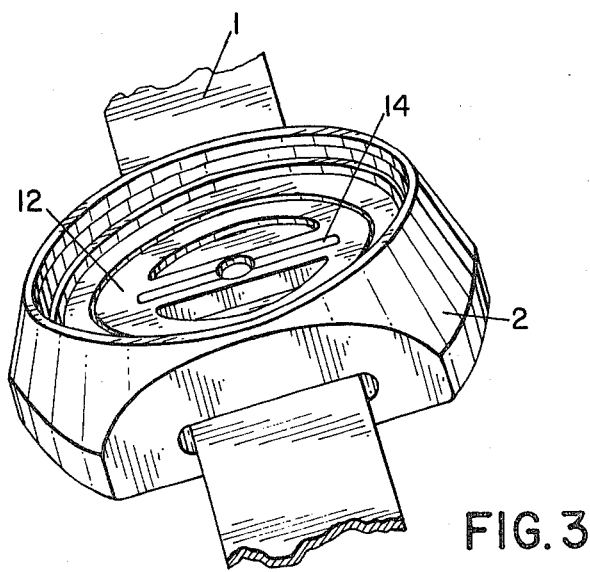
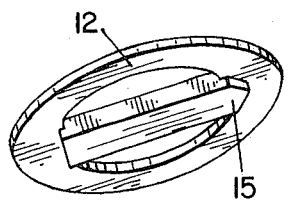

MAGNETIC COMPASS ASSEMBLY

BACKGROUND OF THE INVENTION

This invention relates generally to a magnetic compass, and more particularly to a compass assembly in which a compass capsule having a compass scale is receivable in a casing, the capsule being turnable relative to the casing.

In a magnetic compass for direction finding, a compass needle is pivoted so that it is free to turn about an axis perpendicular to its length, the north seeking end of the needle being clearly marked. In a conventional wrist compass adapted to be worn on the wrist of the user, the compass is enclosed in a capsule which is received within a carrier or casing to which the wrist strap is attached.

In a conventional wrist compass of this type, the casing is normally provided with a sighting element constituted by sighting slots, an arrow of luminous paint or any other fixed line or sight arranged on the casing which accommodates the compass capsule. Frequently, a stretched edge of the casing forms the line of sight. For sighting a target the user of the compass keeps turning until the compass needle coincides with the north - south direction on the set compass scale. The fixed line of sight then coincides with the desired direction.

Because of the different habits of users, it has been found that the usual procedure for operating a compass is often impractical. In actual practice, not every user holds the compass in the same manner. Particular difficulties are experienced by divers, parachutists and other users of wrist compasses in that the user of a conventional compass is then forced to bring his arm into position when sighting a target, which position may be in conflict with the usual habit of the user.

SUMMARY OF THE INVENTION

It is the main object of this invention to obviate the disadvantages encountered with conventional compasses by providing a wrist compass assembly which includes a line-of-sight or sighting element that can be set to satisfy the habits of an individual user and fixed in the selected position.

By a sighting element is meant any of the sighting arrangements previously described, as well as other sighting expedients such as two color points which are made to coincide during the sighting procedure.

A significant feature of the invention is that the adjustability of the sighting element facilitates the handling of the wrist compass and improves the accuracy of the reading without however significantly adding to the cost of the compass.

Compasses have heretofore been suggested in which a manually-rotatable directional arrow is arranged on the compass capsule. But such instruments do not include a compass scale that can be turned relative to the casing. The directional arrow serves as a reference line with respect to the compass scale and has to be reset for each use. In contradistinction, the sighting element in a compass assembly in accordance with the present invention has a different function, for it need not be set every time in keeping with the direction to be used by the user.

In the present invention, the angular position sighting element is only set once before use. Readjustment of the position of the sighting element is not necessary as long as the compass is used by the same individual. When for example the user fixes his walking direction according to a map, the compass scale is turned with reference to the previously fixed line of sight.

Because in the present invention the sighting element rarely requires resetting, it becomes feasible to employ a sighting element which is less readily accessible to the user. Hence the sighting element may be arranged between a detachable transparent compass capsule and the casing therefor. The sighting element of this arrangement is preferably flat and is provided with a line of luminous paint or any other sighting mark, the element being disposed in a depression in the base of the casing and being secured against accidental shifting.

OUTLINE OF DRAWING

For a better understanding of the invention as well as other objects and features thereof, reference is made to the following detailed description to be read in conjunction with the annexed drawing, wherein:

FIG. 1 is an exploded perspective view of a preferred embodiment of a wrist compass assembly in accordance with the invention;

FIG. 2 is a perspective bottom view of the sighting element included in the compass; and FIG. 3 shows the casing of the compass, with the sighting element inserted therein but without the compass capsule.

DESCRIPTION OF INVENTION

Referring now to the drawings, there is shown a compass assembly in accordance with the invention in wrist compass form. This compass may, if desired, be combined with a watch, a depth indicator or a thermometer.

The housing or casing 2 of the wrist compass assembly has a band 1 attached thereto whereby the compass may be strapped onto the wrist of a user. The inner diameter of the cylindrical surface 3 of casing 2 is somewhat greater in the lower part thereof, thereby defining a circumferential groove. This casing groove, which may be relatively shallow, serves to receive a circular rib 8 on a ring 7 forming the border of a compass capsule 5.

Compass capsule 5, which is receivable in the casing, is formed of transparent material and is preferably filled with a damping liquid to absorb vibration. A magnetic needle is pivotally mounted within the capsule, the needle being rotatable with respect to a compass scale whose graduations are inscribed or otherwise applied to the rear of the capsule. Hence one can see through the capsule.

Ring 7 which carries capsule 5 can be inserted without difficulty in casing 2 or removed therefrom, by reason of the fact that the ring is made of elastomeric material. In the inserted state, ring 7 may be turned in the casing together with the compass capsule 5 having the compass scale.

The inner surface of casing 2 below the compass scale on capsule 5 is offset to define an annular depression 10 adapted to accomodate a circular sighting element 12. Sighting element 12 is provided with a diametrically extending web 13 on which the line-of-sight 14 is formed. In the embodiment shown, this line-of-sight is defined by a fluorescent or phosphorescent substance to enhance its visibility.

When circular sighting element 12 is placed in annular depression 10, a raised tooth 15 provided on the rear face of the element in alignment with the line-of-sight formed on the front face thereof is received within a selected gap in the toothing 11 on the circular inner periphery of the annular depression 10. The orientation of the line-of-sight depends on which gap is engaged, and one may therefore readily adjust the angular position of the line-of-sight by selecting an appropriate gap.

Thus once ring 7 holding compass capsule 5 has been inserted in casing 2, the line-of-sight 14 maintains its preset direction, for sighting element 12 is trapped by the capsule. In order to change the setting of the line-of-sight, it is necessary to first withdraw the compass capsule from casing 2 and to then lift out the sighting element 12 and to reinsert it at another angular position.

In operation, after the sighting element has been set to suit the individual preference of the user and the capsule is in place on the wrist compass, no further setting is necessary, and when sighting a target, the user has merely to turn the capsule to align the needle with the north-south direction, at which point the scale shows the compass direction relative to the line-of-sight.

While there has been shown a preferred embodiment of the invention, it is to be understood that many changes and modifications may be made therein without departing from the essential spirit of the invention. For example, instead of locking in the sighting element by means of a tooth, which is received in a gap in a circular toothing on the depression, one may employ for locking purposes a counter-prong or a pin on the sighting element. Other expedients are also possible to prevent accidental or undesired displacement of the sighting element 2 when the compass is in use. Thus the sighting element may be provided with circumferential toothing whose gaps are engaged by a tooth rigidly attached to the casing, this being the reverse of the illustrated locking arrangement.

I claim:
1. A compass assembly comprising:
   A. a casing having a circular open mouth and a bottom,
   B. a transparent compass capsule detachably receivable within the mouth of said casing and turnable therein, said capsule having a compass scale and a magnetic needle which is movable relative to said compass scale, and
   C. a sighting element having a line-of-sight formed thereon, said element being interposed between said capsule and the bottom of said casing and being adjustable to assume a selected angular setting relative to the circular mouth which satisfies the habits of the user.
2. An assembly as set forth in claim 1, further including means to lock said sighting element to said casing at said selected setting.
3. An assembly as set forth in claim 1 wherein said sighting element is flat and is received in a depression formed in the bottom of said casing.
4. An assembly as set forth in claim 3, further including means to lock said flat sighting element to said depression as long as said capsule is inserted to said casing.
5. An assembly as set forth in claim 4, wherein said flat sighting element is circular in form and is so designed that its angular setting with regard to the casing can only be changed by first lifting it out of said depression.
6. An assembly as set forth in claim 5, wherein said depression is in annular form and is provided with a circular toothing at its inner periphery, said sighting element having a tooth which is receivable in a selected gap in said toothing to lock in said sighting element.
7. An assembly as set forth in claim 6, wherein said casing is provided with a wrist-mounting strap.
8. A compass assembly comprising:
   A. a casing having a circular mouth which is provided with a circumferential socket, said casing having a bottom which is provided with an annular depression formed with circular toothing along the inner periphery thereof,
   B. a transparent compass capsule having a border ring, which capsule is detachably receivable in said socket and is turnable relative to said casing, said capsule having a compass scale and a needle which is movable relative to said compass scale, and
   C. a removable flat circular sighting element receivable in said depression, said element being interposed between said capsule and said bottom and being provided with a tooth which is engageable with a selected gap in said toothing, whereby said sighting element is caused to assume a desired angular setting relative to the circular mouth of said casing.
9. An assembly as set forth in claim 8, wherein said ring is made of elastomeric material.
10. An assembly as set forth in claim 8, wherein said sighting element has a line-of-sight formed on the upper face thereof, said tooth being attached to the lower face thereof.
11. An assembly as set forth in claim 10, wherein said line-of-sight is defined by a phosphorescent line.

* * * * *